Dec. 11, 1923.

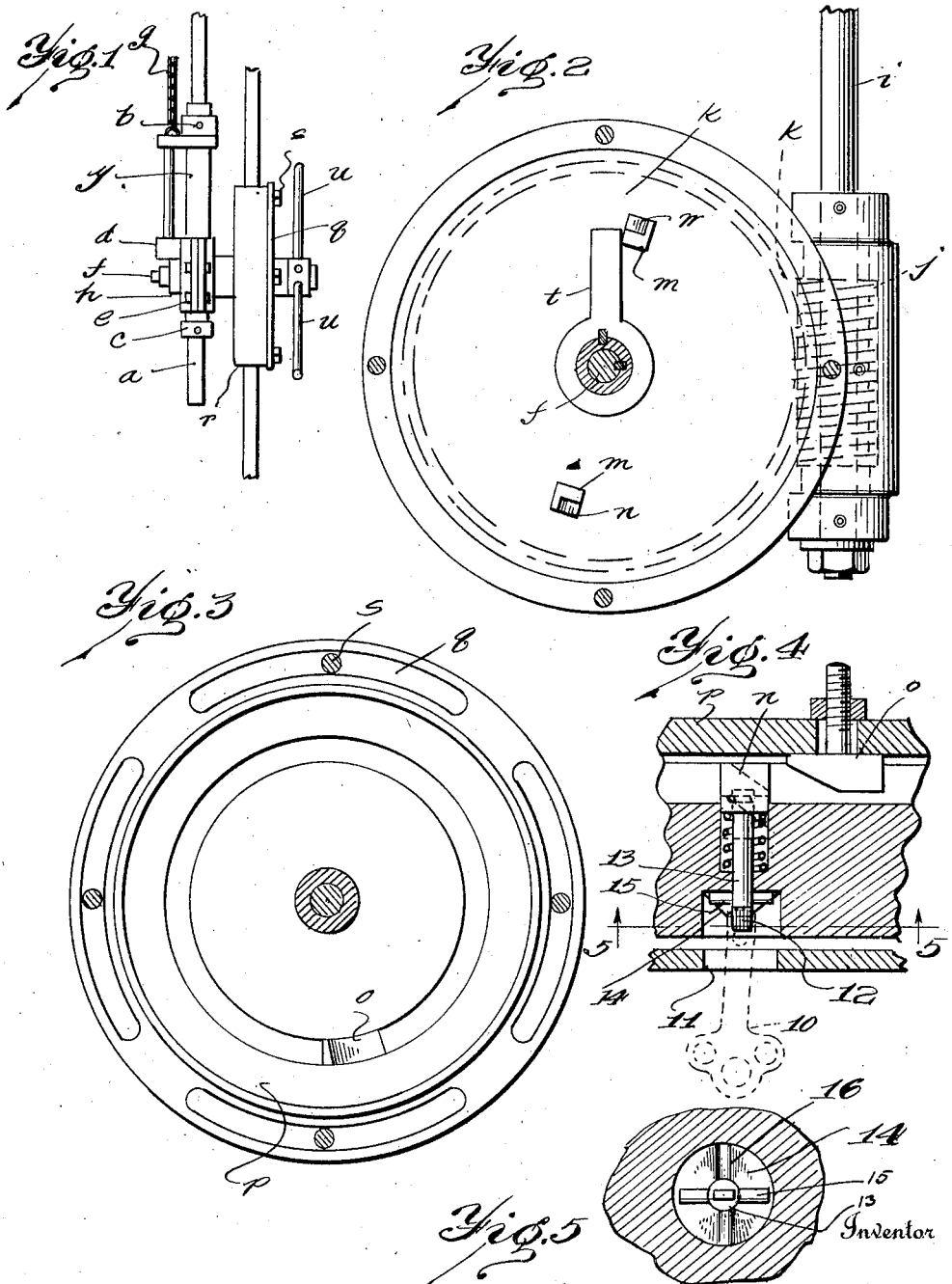

S. BERG ET AL
AUTOMATIC REVERSER
Filed March 30, 1922

Inventor
Simon Berg &
Richard O. Berg

By Stuart C. Barnes
Attorney

Patented Dec. 11, 1923.

1,476,793

UNITED STATES PATENT OFFICE.

SIMON BERG AND RICHARD O. BERG, OF DETROIT, MICHIGAN, ASSIGNORS TO MICHIGAN STEEL TUBE PRODUCTS COMPANY, OF DETROIT, MICHIGAN, A CORPORATION OF MICHIGAN.

AUTOMATIC REVERSER.

Application filed March 30, 1922. Serial No. 547,976.

*To all whom it may concern:*

Be it known that SIMON BERG and RICHARD O. BERG, citizens of the United States, residing at Detroit, in the county of Wayne and State of Michigan, have invented certain new and useful Improvements in Automatic Reversers, of which the following is a specification.

This invention relates to an automatic reverser and is especially designed as an automatic feed reversing device for a drill press.

In the drawings:

Fig. 1 is a front elevation of a portion of a drill press spindle, the drill press feeding shaft and the automatic reverser housing.

Fig. 2 is an elevation of the reverser with the cover plate removed.

Fig. 3 is an inside elevation of the cover plate.

Fig. 4 is a fragmentary section showing the driving lug and releasing cam.

Fig. 5 is a section on the line 5—5 of Fig. 4.

Figure 6:
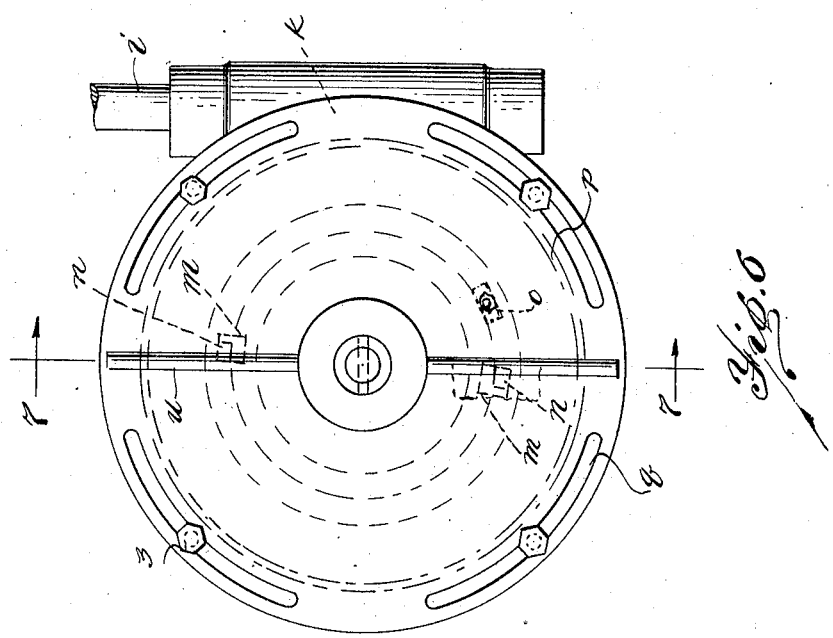
Fig. 6 is an elevation of the reverser with the cover plate in place.
Figure 7:
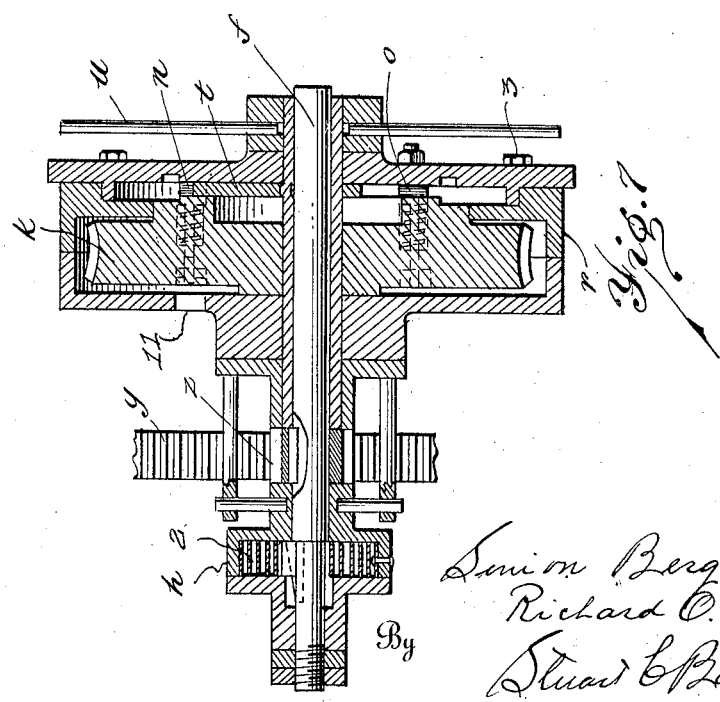
Fig. 7 is a section on the line 7—7 of Fig. 6.

A drill press is ordinarily provided with a rotating spindle $a$ (Fig. 1) which carries the drill or other tool (not shown). This spindle is provided with a pair of collars $b$ and $c$. Between these collars is a yoke $d$ secured loosely around the driving spindle by the clamp $e$. This yoke is a rack carrier. This rack $y$ engages with the pinion $z$ on the shaft $f$ (Fig. 7), consequently when the shaft $f$ is rotating the rack is caused to travel downwardly and carry the rotating drill spindle with it, pressing the drill or tool into the work.

When the driving connections are released, a counter balancing spring 2 (Fig. 7) connected with the cup $h$ and a counter weight (not shown) attached by the chain $g$ to the rack support serve to turn the shaft in return movement. This is common construction in drill presses. In the ordinary semi-automatic feed reverser it is necessary to again actuate the reversing device by hand before it will again start to feed. Ordinarily this is a ball clutch proposition.

In our construction we employ a feeding spindle $i$ which is provided with a worm $j$, that engages the worm wheel $k$. This worm wheel $k$ carries a driving lug or plunger $m$. This plunger has one corner chamfered off as at $n$. In the path of this chamfered corner is a cam $o$ bolted to the cover plate $p$. This cover plate is provided with long segmental slots $q$ so that when the same is bolted to the housing $r$ by the cap screws 3, an adjustment is possible by loosening the cap screws. The position of the cover plate and consequently the position of the reversing cam $o$ can be altered. This will alter the depth to which the feeding device will feed the drill-press spindle before reversing.

The operation is simple. The worm $j$ drives the large worm wheel $k$ at a very much reduced speed, the driving lug $m$ engages the arm $t$, which is connected by keys with shaft $f$. This, of course, establishes a driving connection between the feeding spindle $i$ and the rack operating shaft $f$. This driving coupling will continue until the driving lug $m$ reaches the cam $o$ as shown in Fig. 4. Cam $o$ is in the path of the chamfered corner $n$ of the driving lug and consequently as the two beveled surfaces of the cam and the driving lug engage the driving lug is forced into its socket until it passes beyond the arm $t$. Hence the arm $t$ is released, the coiled counter balancing spring 2 and the counter weight serve to immediately return the rack and the rotating drill spindle to their initial position. The spindle $i$ continues to rotate as does also the worm wheel $k$, until another driving lug comes into contact with the driving arm $t$ whereupon the action is again repeated.

In the drawings we have shown two driving lugs. One or several driving lugs may be used. The more driving lugs that are used the oftener the number of feeding actions for a given revolution of the worm wheel.

In Figs. 4 and 5 we have shown the driving lug as capable of being withdrawn from the face of the worm wheel. This completely disconnects the automatic reversing device so that by applying a hand winch $u$ shown in Fig. 1, the drill press spindle may be optionally fed by hand. To effect this withdrawal of the lug, the key 10 may be inserted through the hole 11 in the back of the housing. The key engages the flattened end 12 of the spindle 13 and by turning the spindle the arms 15 climb the cam surfaces 14 and can rest in the slight depressions 16. This withdraws the lug $m$ from the path of the cam $o$ and allows the operation of the shaft $f$ by hand.

What we claim is:

1. In an automatic reverser, the combination of a driving wheel, a shaft, means for returning the shaft in rotative movement after it has been actuated in a forward feeding movement, driving connections between the driving wheel and the shaft comprising a driving lug provided with a chamfered face and a driving arm arranged to be carried forward by said lug when projected and a spring for normally projecting said lug, and a cam interposed in the path of said chamfered surface of the lug to temporarily withdraw the lug from the face of the driving wheel to permit the said lug to advance ahead of the driving arm to temporarily release the driving connections to permit the return of the shaft, while the driving lug is again projected to pick up the driving arm at the appointed time.

2. In an automatic reverser, the combination of a driving wheel, a shaft, a driving arm secured thereon, means for returning the shaft in return movement when the driving connections with the driving wheel are released, the said driving connections between the said wheel and shaft including a driving lug carried by the driving wheel arranged to engage said driving arm, and means for temporarily releasing the driving arm from the driving lug to permit the returning means to rotate the shaft in return movement whereby the lug again engages the arm to couple up the shaft in direct driving relation after the return movement has taken place.

3. In an automatic reverser, the combination of a driving wheel, a shaft, means for rotating the shaft in return movement when the forward driving connections are released, a spring pressed plunger or driving lug projecting from the face of the driving wheel normally, means by which the spring pressed plunger may be withdrawn and locked in withdrawn position and a cam in the path of the spring pressed plunger by which the said plunger may be withdrawn, a driving arm on the shaft, the said driving arm and spring pressed plunger, when in its projecting position arranged so that the plunger drives the shaft until it encounters the cam whereupon the plunger is temporarily released to permit it to advance ahead of the driving arm, which permits the return movement of the shaft and allows the plunger to again project and pick up the driving arm.

4. In an automatic reverser, the combination of a shaft, a member for driving said shaft in rotation, connections between said member and the shaft including a driver and a driven member secured to the shaft, means for temporarily displacing the driver to permit the same to advance ahead of the driven member, and means for automatically rotating the shaft in reverse movement when this action takes place.

5. In an automatic reverser, the combination of a shaft, a member for rotating the shaft, connections between the shaft and rotating member including a driving connection and a driven connection, means for temporarily displacing one of said connections to permit the driving connection to advance ahead of the driven connection, said means being adjustable as to position to thereby vary the feed movement and means for driving the shaft in reverse movement when the driving connection advances ahead of the driven connection.

6. In an automatic reverser, the combination of a driving wheel, a shaft, means for driving the shaft in return movement when its forward driving connections are released, said forward driving connections including a driving lug carried by the driving wheel to connect with the shaft to rotate the same forward, a cover plate provided with a cam which may be adjusted in varying positions and which serves to release the driving lug from connection with said shaft temporarily to permit the return movement of the shaft but which allows the re-engagement of the driving connections to again rotate the shaft forward.

7. In an automatic reverser, the combination of a driving wheel, a driving lug carried by the driving wheel, a shaft connected with said driving lug to drive the shaft, in a forward driving movement, means for returning the shaft in a return movement when the same is released from the forward driving connection, means for temporarily releasing the driving lug from driving connection with the shaft to permit the operation of the shaft returning means but permitting the driving lug to again pick up connection with the shaft automatically.

8. In an automatic reverser, the combination of a driving wheel, a shaft, means for rotating the shaft in return movement when its forward driving connections are released, the driving connections consisting of a driving member carried by the driving wheel arranged to connect with the shaft, means for withdrawing the driving member and locking the same in withdrawn position, and means for engaging the driving member when in its projecting position for temporarily releasing the driving member from connection with the shaft to permit the return movement of the shaft and which means also permits a reconnection of the driving member with the shaft to again feed the shaft in a forward driving movement at the appointed time.

In testimony whereof we affix our signatures.

RICHARD O. BERG.
SIMON BERG.